Patented Oct. 12, 1926.

1,602,404

UNITED STATES PATENT OFFICE.

JOSEPH C. W. FRAZER, OF BALTIMORE, MARYLAND.

OXIDIZING CATALYST.

No Drawing.　　Application filed September 23, 1924.　Serial No. 739,424.

This invention relates to catalysts, and particularly to a catalyst capable of causing oxidizing reactions.

Generally, in effecting oxidizing reactions by means of previously known catalysts, it has been necessary due to the low activity of the catalytic material to conduct the catalysis at somewhat elevated temperatures, and consequently such catalysts frequently could not be employed economically.

This was especially true before the discovery of "Hopcalite," a catalyst forming the subject matter of Patent No. 1,345,323, dated January 29, 1920, granted jointly to Charles C. Scalione and the present applicant. "Hopcalite" was a decided step in advance constituting a catalyst capable of carrying out the oxidation of certain of the readily oxidizable gases and vapors at room temperature, and thus providing for these reactions a catalyst more active than those previously known, as well as furnishing a catalyst readily revived by easy and economical treatment. However, with "Hopcalite" the species thereof constituting a mixture of compounds of several metals were found to be decidedly the most active. For the most effective results under many conditions, it is therefore obvious that resort was had to the more complicated and costly forms of this catalytic material.

It is an object of this invention to provide a catalyst comprising a simple compound of a metallic oxide which can be used for carrying out oxidizing reactions at reduced temperatures, which is decidedly more active and adsorptive than "Hopcalite" or any other previously known material of a similar nature, which can be economically manufactured, and used, which is completely catalytic in its action when properly employed, and which can be easily and quickly revived if necessary.

Briefly, the catalyst described and claimed herein, considered from the viewpoint of chemical composition, appears to be essentially manganese dioxide ($MnO_2$) in a substantially pure and unadulterated condition. However, its apparent chemical composition is not its only essential attribute, since the most pure manganese dioxide heretofore obtainable, and probably even if free of every contaminating material is not necessarily catalytic because lacking the necessary structure. Because of its apparent chemical composition, however, the material comprising the catalyst forming the subject of this invention will be referred to as manganese dioxide ($MnO_2$). Besides being substantially pure, that is, containing not more than a tolerable amount of adsorbed material which interferes with its catalytic activity, it must be in a very fine state of subdivision, highly porous, and possess certain vital surface characteristics apparently due to the removal of adsorbed alkali salts. In truth, the material can best be defined by the results obtained therewith and its method of preparation. These clearly bespeak its novelty over previously known materials.

The following specific examples will serve to illustrate the preferred methods of preparing the new catalyst as well as its characteristics.

*Example 1.*—Powdered potassium permanganate ($KMnO_4$) or a concentrated cold solution thereof is added to a strong nitric acid ($HNO_3$) solution of a manganous salt, such as manganous sulphate ($MnSO_4$), producing a rapid and complete precipitate of manganese dioxide ($MnO_2$). This precipitate is very black, finely divided, or what may be termed a "sandy" product which can be washed and filtered rather easily. The precipitate is carefully washed with water, the final washing being made with distilled water, to free it of all impurities, then filtered, and pressed to secure a hard porous body. Pressing is essential, otherwise it resembles a dry sandy powder.

It is thought that the permanganate and the manganous salt react in accordance with the following equation:—

$$2KMnO_4 + 3MnSO_4 + 2H_2O = K_2SO_4 + 5MnO_2 + 2H_2SO_4$$

When this reaction is carried out in a solution strongly acid with nitric acid ($HNO_3$), the so-called impurities are evidently changed to nitrates which are evidently less strongly adsorbed and may be readily removed from the manganese dioxide ($MnO_2$) by washing the precipitate with water.

*Example 2.*—Powdered potassium permanganate ($KMnO_4$) is poured into concentrated nitric acid, the mixture being well stirred and kept cool to prevent explosion. Several hours are required in this treatment, and if the above precautions are observed, the changes take place smoothly and without danger. The precipitate obtained is very black, and finely divided, and may be easily washed and filtered as in example 1. It is necessary in this treatment to employ pressing to secure a suitable catalyst. The reaction which likely takes place is shown by the following equation:—

$$4KMnO_4 + 4HNO_3 = 4KNO_3 + 2H_2O + 4MnO_2 + 3O_2$$

*Example 3.*—Moist commercial Fremy oxide is treated with an excess of strong nitric acid ($HNO_3$) then diluted, filtered, and washed, as in Example 1. The most satisfactory results are obtained by allowing the solution to stand for several hours with occasional stirring to keep the particles in suspension. The material thus obtained upon drying gives a fairly hard product without being pressed, but pressing should be employed to assure satisfactory results. As in Example 1, treatment with the nitric acid renders the impurities readily removable from the manganese dioxide, ($MnO_2$) by subsequent washing, as described.

*Example 4.*—A solution of manganous salt, such as the chloride, is treated with a hydroxide or carbonate, as $$MnCl_2 + NaOH = Mn(OH)_2 + 2NaCl$$

or $$MnCl_2 + Na_2CO_3 = MnCO_3 + 2NaCl.$$

The precipitated $Mn(OH)_2$ or $MnCO_3$ is washed thoroughly, dissolved in $HNO_3$, and then evaporated to dryness. It is then carefully heated until the product becomes stable and the oxides of nitrogen liberated. Care must be taken to avoid heating too strongly otherwise the product is likely to become very dense and inactive resembling the natural product. The following equations represent the reactions which take place—

$$Mn(OH)_2 + 2HNO_3 = Mn(NO_3)_2 + 2H_2O$$

$$MnCO_3 + 2HNO_3 = Mn(NO_3)_2 + 2H_2O + CO_2$$

$$Mn(NO_3)_2 = MnO_2 + 2NO_2$$

The dry $MnO_2$ is then treated with concentrated $HNO_3$, washed and dried, as heretofore described in connection with the previous examples.

Instead of treating the $Mn(OH)_2$, as above, it may be thoroughly washed, filtered as dry as possible and left exposed to the atmosphere when the following reaction takes place.

$$2Mn(OH)_2 + O_2 = 2MnO_2 + 2H_2O$$

Subsequent treatment with concentrated $HNO_3$ then converts the brown oxide previously obtained into a very black product which is washed and filtered in the usual way. Such product functions satisfactorily without pressing.

It is noted that in each of the examples given, either Fremy oxide or other manganese compound is subjected to the action of nitric acid and that the ultimate product obtained corresponds in chemical composition approximately to manganese dioxide. A common and vital feature of the several processes described is the treatment of a manganese compound with nitric acid. The term "manganese compound", as used throughout the specification and claims, is intended to include the various compounds containing manganese including examples of impure manganese dioxide such as that made by the so-called Fremy method, which may be treated by nitric acid either in the direct preparation of the dioxide or merely for the purpose of removing impurities from manganese dioxide previously formed. A characteristic of the product obtained is that it is substantially free from solid matter other than oxides of manganese, containing less than 1% of such foreign substances or so-called impurities.

In actual use, it has been found that the catalyst thus produced is perfectly catalytic for the oxidation of carbon monoxide at ordinary temperatures when the gases are kept free of moisture, perfect catalytic action having been carried on under these conditions as low as —20° C. This is 20 degrees lower than temperatures at which "Hopcalite" mixtures have been effective, and between 60 to 100 degrees lower than that at which prior art samples of the simple compound manganese dioxide have proved satisfactory. The temperature range of the new catalyst forming this invention is not only far below that of any of the species of "Hopcalite", but its activity is decidedly greater, is substantially perfectly catalytic at low temperatures, and is not readily poisoned.

Tests have demonstrated that its efficiency is quite evidently dependent upon the nature of the active surface as well as its extent; a sample made in accordance with example 4, for instance, which had been ignited too strongly on evaporation became rather dense and entirely inactive although free of alkalies. Apparently a total change of structure and alteration of the surface took place without destroying the porous structure. Another difference over previously known catalysts, as shown by the adsorption curves obtained from a number of tests, is the extremely high adsorption values for the manganese dioxide prepared as previously described, and no induction period is required even at low temperatures. It has also been found that with such samples of manganese dioxide as described in this application there is a greater temperature interval available for the catalytic oxidation of carbon monoxide in the presence of hydrogen than is the case with "Hopcalite," thus rendering it more effective for carbon monoxide admixed with hydrogen.

Catalysts prepared as above may be used to accomplish the oxidation of most of the readily oxidizable gases and vapors, for example carbon monoxide, ammonia, sulphur dioxide, aldehydes, alcohols, toluene, etc., by passing them mixed with oxygen or air through the catalyst at or above —20° C.

When the catalyst has been used under conditions to render it inactive from the presence of moisture, or has adsorbed water vapor from the atmosphere, it may again be immediately recovered or revived by heating to about 150° in a stream of dry air. In order to assure the most satisfactory results, the catalyst preferably should be dried under these conditions preliminary to use.

As required by the patent statutes, the invention has been described in connection with the best methods now known for practicing it, but it is not intended to limit the scope thereof beyond that particularly set forth and defined by the appended claims.

I claim:

1. A highly active oxidizing catalyst consisting of finely divided porous manganese dioxide formed by treating a manganese compound with nitric acid while cold.

2. A highly active oxidizing catalyst consisting of finely divided porous manganese dioxide capable of catalytic action at and above —20° C., the manganese dioxide being formed by treating a manganese compound with nitric acid while cold.

3. A highly active oxidizing catalyst consisting of finely divided porous manganese dioxide containing less than 1% of impurities, the manganese dioxide being formed by treating a manganese compound with nitric acid while cold.

4. A highly active oxdizing catalyst consisting of finely divided porous manganese dioxide, substantially free from adsorbed alkalis, the manganese dioxide being formed by treating a manganese compound with nitric acid while cold.

5. A highly active oxidizing catalyst consisting of finely divided porous manganese dioxide substantially free from adsorbed alkalis and containing less than 1% of impurities, the manganese dioxide being formed by treating a manganese compound with nitric acid while cold.

In testimony whereof, I sign my name.

JOSEPH C. W. FRAZER.